W. BROWN.
EMERGENCY DRIVING APPARATUS FOR MOTOR VEHICLES.
APPLICATION FILED JAN. 11, 1913.
1,112,595.
Patented Oct. 6, 1914.
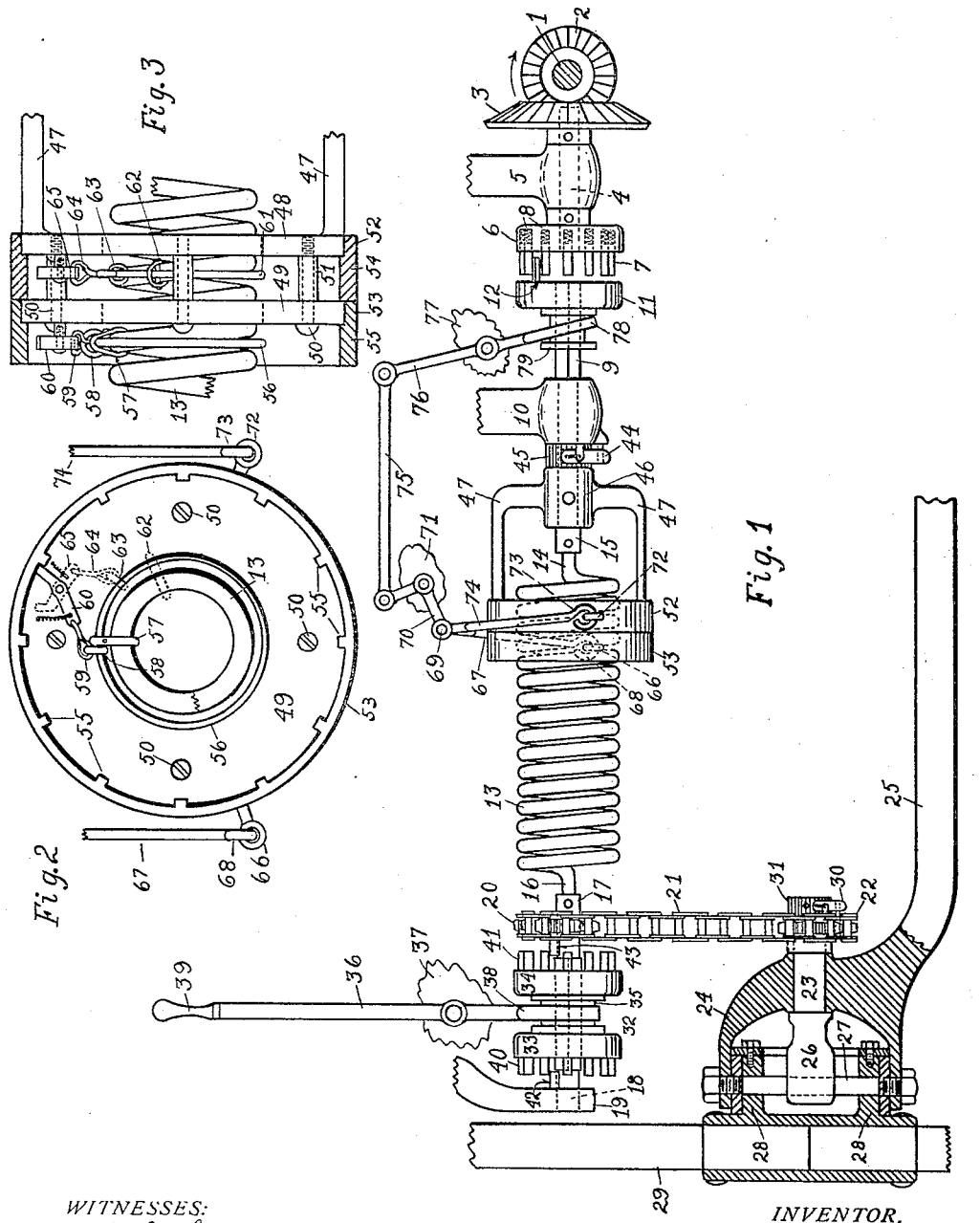
WITNESSES:
INVENTOR,
William Brown,
BY
ATTORNEY.

UNITED STATES PATENT OFFICE.

WILLIAM BROWN, OF WEST CUMMINGTON, MASSACHUSETTS.

EMERGENCY DRIVING APPARATUS FOR MOTOR-VEHICLES.

1,112,595.   Specification of Letters Patent.   Patented Oct. 6, 1914.

Application filed January 11, 1913. Serial No. 741,575.

*To all whom it may concern:*

Be it known that I, WILLIAM BROWN, a citizen of the United States, residing at West Cummington, in the county of Hampshire and State of Massachusetts, have invented certain new and useful Improvements in Emergency Driving Apparatus for Motor-Vehicles, of which the following is a specification.

My invention relates to auxiliary apparatus for propelling motor vehicles.

Vehicles of this class, wherein the power derived from an internal combustion engine is applied through suitable transmission apparatus to the rear carriage wheels, are frequently stalled and rendered powerless to advance or retreat when the driven wheels fail to disengage from ruts or make sufficient contact on slippery or smooth surfaces. At such times assistance rendered in the form of power applied to rotate the front wheels will frequently effectually extricate the vehicle from its stalled position.

The principal object, therefore, of my invention concerns the provision of suitable means for propelling the vehicle by the application of power directly to the front wheels.

I will proceed to describe a specific useful form of embodiment of the invention, in connection with the accompanying drawings, wherein, Figure 1 is an assembled plan view of my device operatively connected to the main driving shaft and a front wheel of a motor vehicle of the class referred to; Fig. 2, a cross-sectional view of the main spring and the surrounding clutch-control mechanism, and Fig. 3, a detail vertical section of the parts shown in Fig. 2.

As shown, the main driving shaft 1 of the vehicle is provided forwardly with an annular bevel gear 2, arranged thereon to mesh with a similar gear 3 arranged at an angle thereto and carried on one end of a shaft 4 journaled in a fixed bearing 5 conveniently secured to the vehicle frame. Mounted on the opposite end of the shaft 4 is a rotary clutch disk 6 provided on its engaging face with a series of spaced teeth 7, 7, etc., annularly arranged on the margin thereof and movably secured in transverse recesses provided with coiled springs 8, which tend to actuate the teeth outward.

In alinement with the shaft 4 is shown a normally stationary shaft 9 journaled in a fixed bearing 10, which is secured to any convenient support, the inner end of shaft 9 being preferably square in cross-section and having mounted thereon a slidable clutch disk 11, which is provided on its inner face with a thrust or pin 12 extending toward the disk 6 and so disposed with reference to the teeth 7 that when the clutch is closed the pin 12 is projected into one of the interstices between the teeth 7 and adapted to engage therewith.

Secured in fixed relation to the outer end of the shaft 9 beyond the bearing 10, is shown a heavy coiled spring 13, the inner end 14 thereof being in alinement with the shaft 9 and preferably attached thereto by a coupling 15 riveted to the shaft while the outer end 16 of the spring is secured in a similar manner by a coupling 17 riveted to the inner end of a separate shaft 18, in alinement with the shaft 9 and journaled in a suitable bearing 19 secured to a convenient support. Loosely mounted on the shaft 18 is a sprocket wheel 20 connected by a link belting 21 to a separate sprocket wheel 22 carried on the inner end of a shaft 23 journaled in the jaw 24 provided at one end of the forward axle 25 of the vehicle. Said shaft 23 is provided at its outer end, which is extended beyond the jaw 24, with an enlarged head 26 having an opening therethrough to receive a bolt 27 secured at its ends to opposite sides of the hub 28 of the carriage wheel 29 and adapted to rotate therewith. While the sprocket wheel 22 is loosely mounted on the shaft 23 it is provided laterally with a spring-controlled dog 30 adapted to trip on a ratchet 31 provided on the inner end of the shaft 23, whereby the shaft 23 is rotated with the sprocket wheel 22 when the vehicle is advanced.

The central portion of the shaft 18 is preferably constructed square in cross-section and slidably mounted thereon is a double clutch 32 having spaced disks 33, 34, secured in fixed relation to each other and connected by a reduced neck 35. Said clutch 32 may be actuated backward or forward on the shaft 18 by a clutch lever 36 which is pivoted centrally to a convenient support 37 and provided at its lower end with a jaw 38 straddling the neck 35 of the clutch, the upper end of the lever 36 being provided with a handle 39 for manipulation by the driver of the vehicle. Each of the disks 33, 34, are provided on their faces with teeth 40, 40, etc., 41, 41, etc., similar to the disk 6 above described, while thrusts or pins 42, 43, prearranged on the inner side of the bearing 19 and on the outer side of the sprocket wheel 20, respectively, operate in turn to prevent the rotation of the shaft 18 and the ratchet wheel 20 when brought into engagement with the teeth on the opposing faces of the disks 33, 34.

To oppose the movement of the shaft 9 in a direction opposite to its normal rotation, is shown a spring-controlled dog 44 carried by the bearing 10 and arranged to trip on a ratchet 45 provided on said shaft.

Secured in fixed relation on the shaft 9, preferably intermediate the ratchet 45 and the coupling 15, is shown a bushing 46 having oppositely arranged radial arms 47, 47, extending outward and then at an angle forward to points adjacent the rear end of the spring 13, there terminating in a plate or apertured disk 48 disposed in a vertical position freely around the spring and connecting the arms 47.

Arranged forwardly of the plate 48 and in parallel spaced relation thereto, is shown a similar plate 49 secured thereto at a plurality of points preferably by screws 50, 50, etc. carrying bushings 51, which operate as spacing devices between the plates. Peripherally arranged in movable relation around each of the plates 48, 49, are separate drums 52, 53, constructed to form preferably a continuous surface, each of the drums being interiorly provided with a series of transverse ledges 54, 54, etc., 55, 55, etc. distributed around the inner surfaces thereof and adapted to engage at their rear ends with the plates 48, 49, respectively. Freely disposed around the spring 13 within the drum 53 is a ring 56 secured to said spring preferably in rigid relation by a clamp 57 and having a smaller ring or runner 58 interlooped therewith and mounted to move freely thereon, said runner being jointedly connected by an eye-bolt 59 to a spring-controlled dog 60 pivoted to the plate 49 and arranged to trip on the ledges 55, 55, etc., of the plate, as will be hereinafter described. Similarly provided within the drum 52 is a ring 61 secured in fixed relation to the spring 13 by a clamp 62 and having mounted to move freely thereon a runner 63 attached by an eye-bolt 64 to a spring-controlled dog 65 pivoted to the plate 48 and arranged to trip on the ledges 54, 54, etc. of said plate, as and for the purpose hereinafter described. Said drum 53 is exteriorly provided on one side with an apertured lug 66 for jointed attachment with a rod 67 having at its lower end an eye 68 intercepting the lug 66, the body portion of the rod being extended upward for pivotal connection at its upper end with a transverse bar 69 pivoted centrally to the lower arm of a bell-crank 70, which is pivoted at its elbow to a convenient support 71. Similarly, the drum 52 is provided on one side, which is opposite to the lug 68 of the drum 53, with a lug 72 connected to an eye 73 at the lower end of a rod 74 pivotally attached at its upper end to the said transverse bar 69. The upper arm of the bell-crank 70 is pivotally secured to the forward end of a rod 75 extending rearward to a point over the rear end of the shaft 9 for pivotal connection with the upper end of a clutch lever 76, which is pivoted centrally to a convenient support 77 and provided at its lower end with a fork or jaw 78 arranged to straddle a spool-sleeve 79 inclosing the shaft 9 and provided on the front side of the clutch disk 11, said jaw being automatically operated backward and forward, as hereinafter described, to control the said rear clutch.

The operation of the device may be described as follows: Supposing the disks 6, 11, to be locked by the engagement of the pin 12 with the teeth 7, 7, the rotation of the driving shaft 1 of the vehicle in the direction of the arrow (Fig. 1) causes the shafts 4, 9, carrying the disks 6, 11, to rotate in the opposite direction, or counter-clockwise. The rotation of the shaft 9, which controls the inner end of the spring 13, causes the spring to wind at a reduced speed in the same direction, the inner end of the spring being first affected and to a greater extent than the opposite end. The shaft 18 securing the outer end of the spring 13 is held in stationary position by the arrangement of the clutch 32, the teeth 40 of the outer disk 33 being thrown into engagement with the pin 42 on the bearing 19 through the medium of the lever 36. Revolving with the shaft 9 and at the same rate of speed, the plates 48, 49, secured to the shaft by the arms 47, 47, move slidably within their respective drums 52, 53, drawing with them the runners 58, 63, which advance around the spring 13 on their respective rings 56, 61, such advancement being due to the increased speed of the plates over that of the spring. The clamp 57 on the forward ring 56 is prearranged to engage with the runner 58 before the runner 63 catches up with the inner clamp 62, hence at the moment of the engagement of the runner 58 with the clamp 57 the dog 60, controlled thereby, trips on the adjacent ledge 55 of the drum 53, which is normally stationary, causing the drum to rotate with the plates and actuating thereby the rod 67 upward. This upward action of the rod 67 causes the rod 75 to throw the clutch lever 76 inward, disconnecting the clutch disks 6, 11, and stopping the shaft 9, which is prevented from rotating reversely under the influence of the spring 13 by the ratchet 45. The stopping of the shaft 9 is arranged to occur substantially at the moment at which the spring 13 is fully wound up.

When the emergency occurs to employ the power stored in the spring through the means above described, the driver of the vehicle reverses the position of the lever 36, which throws the disk 34 of the clutch 32 into engagement with the pin 43 on the sprocket 20 and at the same time releases the shaft 18 by the disengagement of the disk 33. Hence the shaft 18 is free to revolve under the influence of the spring 13. As the outer end of the spring will rotate, when released, in a counter-clockwise direction, the shaft 23 is thus rotated, by means of the belting 21, in a similar direction, causing the vehicle wheel 29 to move forward and thereby extricating the vehicle from its stalled position. As the spring 13 unwinds, the clamp 62 is rotated slowly until it comes into contact with the runner 63 controlling the dog 65, which is now tripped on an adjacent ledge 54 of the drum 52, and the said drum is thus actuated in the same direction, causing the rod 74 to move downward. Hence the clutch-lever 76 is again affected, this time throwing the disk 11 into engagement with the disk 6 and causing the spring 13 to be rewound under the power of the driving shaft 1. The driver at the same time throws the lever 36 to reverse the position of the clutch 32. The position of the clamp 62 is prearranged on the spring 13 with reference to the position of the clamp 57, whereby with the unwinding of the spring 13, the dog 65 is actuated before the dog 60, thus insuring the reversal of the position of the rear clutch disk 11.

It will be apparent that a device of the character described may be employed on opposite sides of the vehicle by mere duplication of the parts, whereby each of the front wheels may be actuated independently of the rear wheels, at one or at different times.

One advantage of a yielding element such as the spring 13 over a solid rigid shaft is that the vehicle wheel may rotate at a varying speed quite independent of the speed of the driving shaft, which is actuated by positive means, and a further advantage is the capacity to store energy for release at a time when the driven shaft would not be operative.

I claim:—

1. The combination, in a motor vehicle having a main driving shaft for rotating the rear carriage wheels, of auxiliary apparatus including a driving spring for rotating at least one of the front carriage wheels and means for detachably connecting the spring with said shaft for winding up the spring.

2. The combination, in a motor vehicle having a main driving shaft for rotating the rear carriage wheels, of emergency spring means for rotating at least one of the front carriage wheels and including a medium for receiving and storing mechanical energy, means for transmitting energy from said shaft to said medium, means for releasing at will the energy stored in said medium, and means for transmitting the energy so released to said front vehicle wheel.

3. In a motor vehicle having a driving shaft for rotating the rear carriage wheels, auxiliary apparatus for rotating at least one of the front carriage wheels and including a helically formed spring, means for detachably connecting the shaft with one end of the spring for winding up the same, means for securing the opposite end of the spring in normally stationary position, means for connecting said stationary end of the spring with said front wheel, and means for releasing the spring when under tension.

4. In motor vehicles having a driving shaft for rotating the rear carriage wheels, auxiliary motor apparatus including a spirally formed spring, a shaft secured to one end of the spring and detachably connected to the main shaft for rotating the spring, means for securing the opposite end of the spring in stationary position, a separate shaft secured to the stationary end of the spring, means for releasing the spring when under tension, and means for transmitting the energy imparted to said shaft at the normally stationary end of the spring when released, to at least one of the front carriage wheels for rotating the same.

5. In motor vehicles having a driving shaft for rotating the rear carriage wheels, auxiliary means for rotating at least one of the front carriage wheels and including a spiral spring, means for connecting one end of the spring with the front wheel, means for detachably connecting the opposite end of the spring with the shaft for winding up the spring, and means for automatically disconnecting the spring from said shaft.

In testimony whereof I hereto affix my signature in presence of two witnesses.

WILLIAM BROWN.

Witnesses:
 JNO. J. WHITTLESEY,
 CHESTER AVERILL.

Copies of this patent may be obtained for five cents each, by addressing the "Commissioner of Patents, Washington, D. C."